(12) United States Patent
Nijdam et al.

(10) Patent No.: US 12,163,607 B2
(45) Date of Patent: Dec. 10, 2024

(54) PIPE HANGER

(71) Applicant: J. VAN WALRAVEN HOLDING B.V., Mijdrecht (NL)

(72) Inventors: Frank Nijdam, Harderwijk (NL); Marek Juzak, Mijdrecht (NL)

(73) Assignee: J. VAN WALRAVEN HOLDING B.V., Mijdrecht (NL)

( * ) Notice: Subject to any disclaimer, the term of this patent is extended or adjusted under 35 U.S.C. 154(b) by 0 days.

(21) Appl. No.: 18/263,938

(22) PCT Filed: Feb. 7, 2022

(86) PCT No.: PCT/EP2022/052871
§ 371 (c)(1),
(2) Date: Aug. 2, 2023

(87) PCT Pub. No.: WO2022/171567
PCT Pub. Date: Aug. 18, 2022

(65) Prior Publication Data
US 2024/0125410 A1   Apr. 18, 2024

(30) Foreign Application Priority Data
Feb. 9, 2021   (NL) .................................... 2027525

(51) Int. Cl.
*F16L 3/133*   (2006.01)
(52) U.S. Cl.
CPC .................................. *F16L 3/133* (2013.01)
(58) Field of Classification Search
CPC ....... F16L 3/127; F16L 3/1218; F16L 3/1075; F16L 3/20; F16L 3/18; F16L 3/133; F16L 3/11; E21F 17/02
(Continued)

(56) References Cited

U.S. PATENT DOCUMENTS 2,466,247 A * 4/1949 Land .................. F16L 3/14
                                                  248/62
3,652,045 A * 3/1972 Hirt .................... F16L 3/11
                                                  248/62
(Continued)

FOREIGN PATENT DOCUMENTS

EP        3405711 B1     3/2020

OTHER PUBLICATIONS

International Search Report for PCT/EP2022/052871 dated Apr. 13, 2022 (5 pages).

*Primary Examiner* — Christopher Garft
(74) *Attorney, Agent, or Firm* — Tutunjian & Bitetto, P.C.

(57) ABSTRACT

Pipe hanger including an upper hanger part, a lower hanger part and a connecting rod, the upper hanger part being adapted to be mounted to a support member, wherein in a closed state of the pipe hanger depending arms of the upper hanger part and corresponding legs of the lower hanger part are coupled by the connecting rod which is passed through bores of both the upper hanger part and lower hanger part, the connecting rod defining a substantially horizontal rotational axis. The connecting rod is provided with a male thread, wherein at least one of the bores of the depending arms are threaded holes, wherein in the closed state the shank of the connecting rod is threaded through said at least one threaded hole. At least one of the legs of the lower part has an outwardly projecting flange formed as a bent end portion of said leg.

17 Claims, 8 Drawing Sheets

(58) Field of Classification Search
USPC ............................... 248/58, 62–63; 174/40 R
See application file for complete search history.

(56) References Cited

U.S. PATENT DOCUMENTS

| | | | | |
|---|---|---|---|---|
| 4,019,706 | A * | 4/1977 | Weiland, Sr. ............. | F16L 3/11 |
| | | | | 248/62 |
| 5,219,427 | A * | 6/1993 | Harris ....................... | F16L 3/11 |
| | | | | 248/62 |
| 5,848,770 | A * | 12/1998 | Oliver ..................... | E21F 17/02 |
| | | | | 248/62 |
| 2006/0018071 | A1 | 1/2006 | Ono | |
| 2006/0180713 | A1* | 8/2006 | Olle .......................... | F16L 3/11 |
| | | | | 248/58 |
| 2019/0017630 | A1* | 1/2019 | Juzak .................... | F16L 3/1075 |
| 2021/0080032 | A1* | 3/2021 | Belen ....................... | F16L 3/11 |
| 2021/0080033 | A1* | 3/2021 | Belen .................... | F16B 39/108 |

* cited by examiner

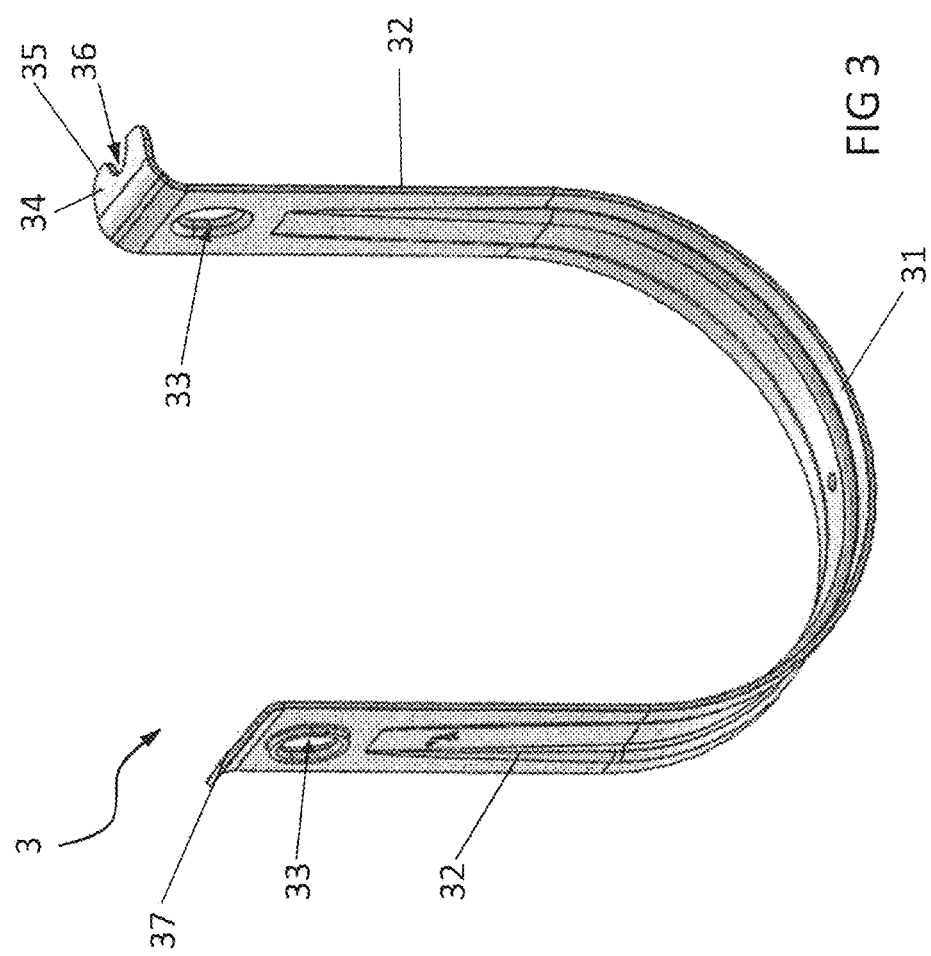

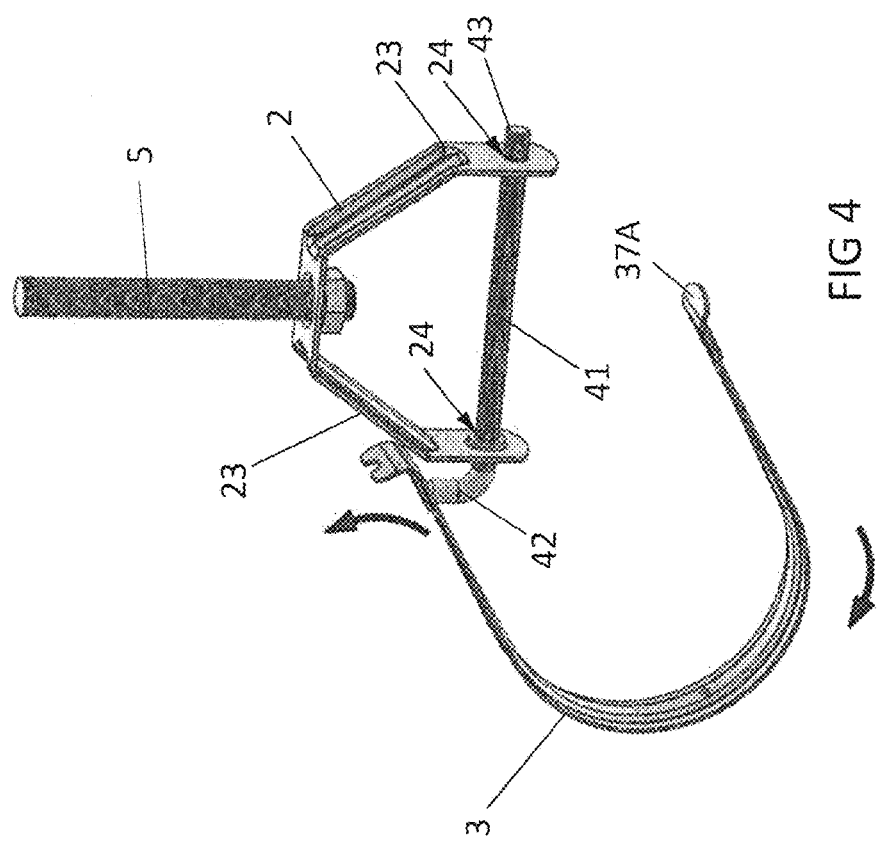

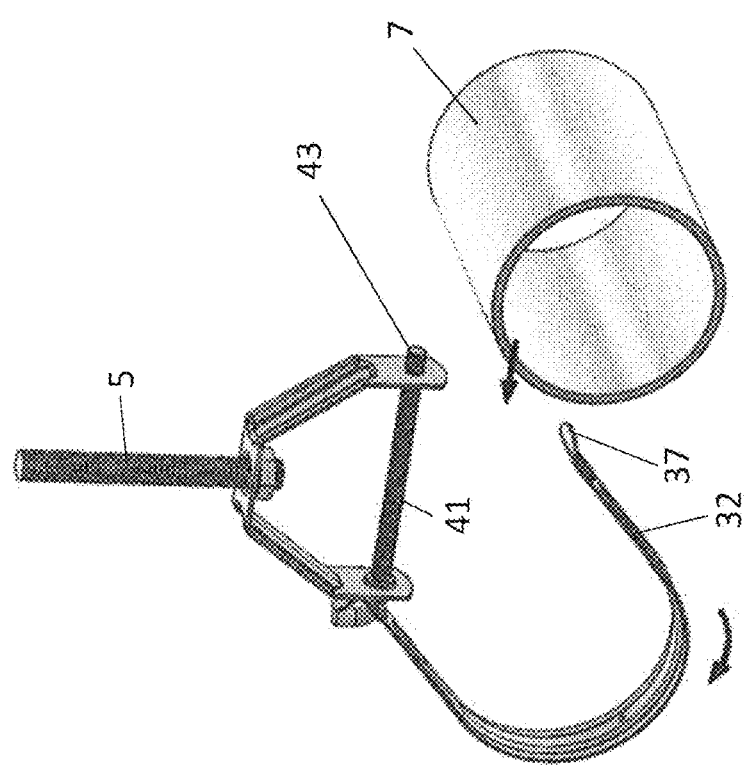

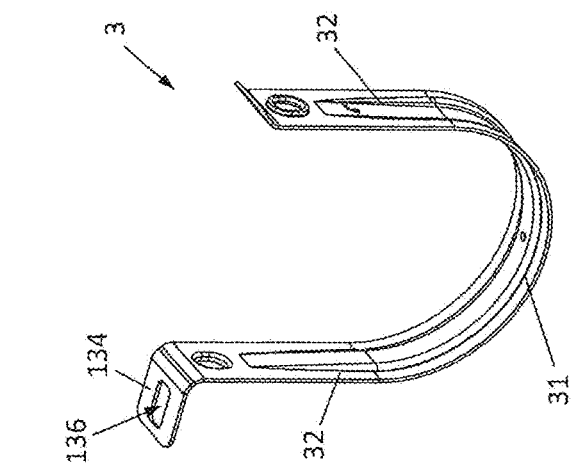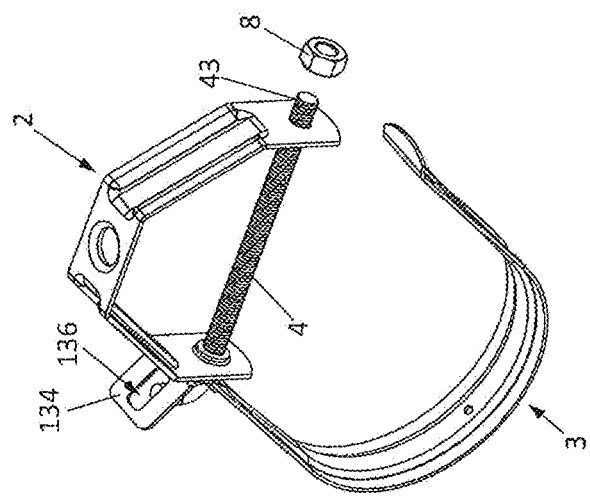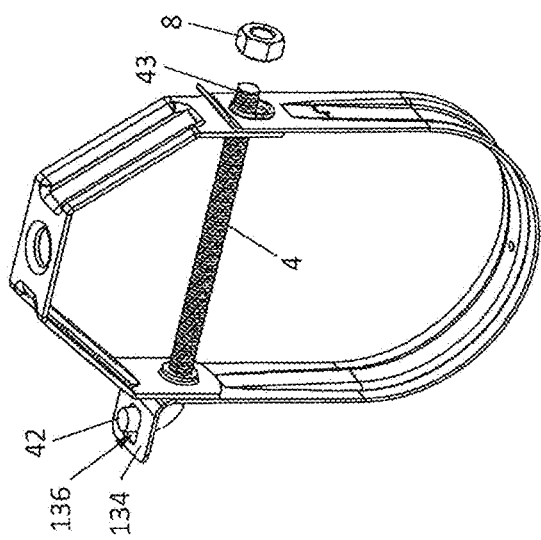

PIPE HANGER

FIELD OF THE INVENTION

The present invention relates to a pipe hanger for supporting pipes, in particular known in the art as a 'Clevis hanger'.

BACKGROUND

A Clevis hanger comprises an upper hanger part, a lower hanger part and a connecting rod, the upper hanger part being adapted to be mounted to a support member The upper hanger part has a centre portion and two downwardly extending depending arms at the sides thereof, which upper hanger part includes on each of its depending arms at least one bore, which bores are at least partially aligned.

The lower hanger part has a saddle portion for supporting a pipe and two upwardly extending legs at the sides thereof, which lower hanger part includes on each of the legs at least one bore, which bores are at least partially aligned.

In a closed state of the pipe hanger the depending arms of the upper hanger part and the corresponding legs of the lower hanger part are coupled by the connecting rod which is passed through said bores of both the upper hanger part and lower hanger part, the connecting rod defining a substantially horizontal rotational axis.

In said closed state the depending arms of the upper hanger part and the corresponding legs of the lower hanger part have an overlapped portion so as to allow for aligning the respective bores of the arms and legs for passing through the connecting rod.

The connecting rod comprises a substantially straight shank and an end portion bent with respect to the shank, the shank being passed through said bores of both the upper hanger part and the lower hanger part.

Clevis hangers may be used to support pipes, e.g. to suspend them from a structure, e.g. a ceiling or other overhead support. Typically, Clevis hangers comprise an upper hanger part configured to be coupled with the structure and a U-shaped lower hanger part defining a pipe receiving saddle.

US 2006/0180713 A1 discloses in FIG. 10 a pipe hanger with an L-shaped connecting rod. In this pipe hanger, the connection rod has a protrusion at one end opposite the bent end portion. The leg of the lower hanger part has a keyhole shape. The rod with protrusion is aligned with the keyhole shape and passed through. When the protrusion has passed the keyhole, the rod is rotated to misalign the protrusion with the keyhole. The bent end portion tends to hang down under the influence of gravity and thereby rotates the rod and misaligns the protrusion and the keyhole.

U.S. Pat. No. 3,652,045 discloses in FIGS. 1-7 a similar clevis hanger with L-shaped connecting rod and lugs to be aligned and misaligned with keyhole shaped apertures, wherein the bent end portion hangs downward under the influence of gravity. To avoid release under influence of vibrations an edge portion is slightly bent outwardly to press against the bent end portion of the connecting rod.

The invention has for an object to provide a pipe hanger, which allows for easy installation in a wider variety of situations than the known clevis hangers, whilst also constituting a rigid structure when the pipe hanger is installed.

This object is achieved by pipe hanger according to the present application.

SUMMARY OF THE INVENTION

A pipe hanger comprising an upper hanger part, a lower hanger part and a connecting rod, the upper hanger part being adapted to be mounted to a support member. The upper hanger part has a centre portion and two downwardly extending depending arms at the sides thereof, which upper hanger part includes on each of its depending arms at least one bore, which bores are at least partially aligned. The lower hanger part has a saddle portion for supporting a pipe and two upwardly extending legs at the sides thereof, which lower hanger part includes on each of the legs at least one aperture, which apertures are at least partially aligned. In a closed state of the pipe hanger the depending arms of the upper hanger part and the corresponding legs of the lower hanger part are coupled by the connecting rod, which is passed through said bores of both the upper hanger part and lower hanger part, the connecting rod defining a substantially horizontal rotational axis. In said closed state the depending arms of the upper hanger part and the corresponding legs of the lower hanger part have an overlapped portion so as to allow for aligning the respective bores of the arms and legs for passing through the connecting rod. The connecting rod comprises a substantially straight shank and an end portion bent with respect to the shank, the shank being passed through said bores of both the upper hanger part and the lower hanger part. The legs of the lower hanger part are arranged on an outer side of the depending arms of the upper hanger part in the overlapped portion. At least the shank of the connecting rod is at least partially provided with a male thread, wherein at least one of the bores of the depending arms are threaded holes, wherein in the closed state the shank of the connecting rod is threaded through said at least one threaded hole. At least one of the legs of the lower hanger part has an outwardly projecting flange formed as a bent end portion of said leg, said flange having a recess adapted to receive the bent end portion of the connecting rod so as to interlock the connecting rod and the lower hanger part in a rotational direction around the rotational axis in the closed state.

Contrary to the known clevis hangers, the bent end portion of the connecting rod is directed upwardly when the upper hanger portion is suspended from an overhead structure. Also during installation of the pipe hanger and installation of a pipe in the pipe hanger the bent end portion of the connecting rod extends upwardly whereby the bent end portion of the connecting rod provides a suspending hook, from which the lower hanger part can be suspended with one leg. This allows installation of a pipe in the hanger, wherein the lower hanger part is initially disassembled, or only half assembled with the upper part in an open state suspending from the mentioned one leg. The pipe is then arranged in the lower part of the pipe hanger after which the hanger is closed. Furthermore a third option is foreseen, in which first the upper and lower hanger part are assembled in a closed state by means of the connecting rod. Next, the pipe can slide in its axial direction through the assembled hanger. In this third option the bent end portion, which is received in the recess, which couples a swivelling movement of the lower hanger part around the axis of the connecting rod with a rotational movement of the connecting rod. Thereby the pipe hanger can absorb a possible thermal expansion of the pipe in the hanger in an axial direction. In the closed state of the pipe hanger, the bent end portion, which is received in the recess, is secured in its position and rotation of the connecting rod is coupled to the swivelling movement of the lower hanger part. The rotational coupling of the connection rod and the lower hanger part warrants that the connection cannot be released inadvertently while the pipe hanger is in the closed state.

Preferably, the connecting rod is made by cutting a threaded rod to length and bending one end portion to form the bent end portion. This allows an easy and cost effective manufacturing of the connecting rod from a length of a standard threaded rod, which is a staple product.

In a possible embodiment, the end portion of the connecting rod is bent at a substantially right angle with respect to the shank.

In a further embodiment, the outwardly projecting flange is bent at a substantially right angle with respect to the leg.

In another possible embodiment, the bent end portion of the connecting rod is received in the recess of the flange of the leg at a substantially right angle.

In a practical embodiment—in the closed state, or in an intermediate closing state wherein the connecting rod is threaded through the threaded holes in the depending arms but the upper hanger part and the corresponding legs of the lower hanger part are not yet coupled—the bent end portion of the connecting rod extends substantially upwardly.

In a practical embodiment, the bores of the legs of the lower hanger part are elongate bores. These elongated bores preferable extend vertically along the respective legs. This provides ease of installation, also when installing a pipe in the pipe hanger in the open state. The vertical elongated bore especially gives room to manoeuvre when aligning the bore in the leg with the connecting rod.

In a possible embodiment the recess is formed in an edge of the flange, in particular the recess is provided in an outwardly facing edge of the flange. In this embodiment the recess may have a substantially semi-cylindrical shape. The recess may have a dimension corresponding to about half the diameter of the connecting rod, which warrants the coupling of the connecting rod and the lower hanger part.

In another embodiment the recess is formed as an elongate hole provided in the flange, said elongate hole having a longitudinal axis extending in the outward direction.

In a possible embodiment, the other one of the legs has a bent end portion, which is bent outwardly over an angle less than 900 with respect to the leg, preferably an angle in the range 30°-60°.

In another aspect the invention relates to a method for installation of a pipe in a hanger as described in the above, wherein:
- the lower hanger part is with the aperture of the leg having the flange in a hooked state over the bent end portion of the connecting rod;
- the pipe is moved transversely through an opening between the other leg and the corresponding arm of the upper hanger part and arranged in the lower hanger part;
- the lower hanger part is swivelled towards the closed state in which said other leg with its aperture is hooked over the end of the shank opposite the bent end portion;
- a nut is screwed on the end of the shank.

In yet another aspect the invention relates to a method for installation of a pipe in a hanger as described in the above, wherein:
- the pipe is arranged in the lower hanger part, which is disassembled from the upper hanger part;
- the lower hanger part with the pipe in it is moved towards the upper hanger part;
- the lower hanger part is hooked with the aperture of the leg having the flange over the bent end portion of the connecting rod; and
- the lower hanger part is swivelled towards the closed state in which the free leg is hooked with its aperture over the end of the shank opposite the bent end portion;
- a nut is screwed on the end of the shank.

In yet another aspect the invention relates to a method for installation of a pipe in a hanger as described in the above, wherein the pipe hanger is in the closed state and the pipe is moved in an axial direction into the closed pipe hanger.

The invention will be explained further with reference to the drawings, in which like reference symbols designate like parts.

BRIEF DESCRIPTION OF THE DRAWINGS

FIG. 3 shows a view in perspective of a lower hanger part for the pipe hanger of FIG. 1;

FIG. 4 shows an intermediate state while assembling an upper and a lower hanger part from the pipe hanger of FIG. 1;

FIG. 5 illustrates a first installation method for installing a pipe into the pipe hanger of FIG. 1;

FIG. 8 shows a view in perspective of an alternative embodiment of a pipe hanger according to invention in a closed state;

FIG. 9 shows an intermediate state while assembling an upper and a lower hanger part from the pipe hanger of FIG. 8; and FIG. 10 shows a view in perspective of a lower hanger part for the pipe hanger of FIG. 8.

DETAILED DESCRIPTION

Figure 1:
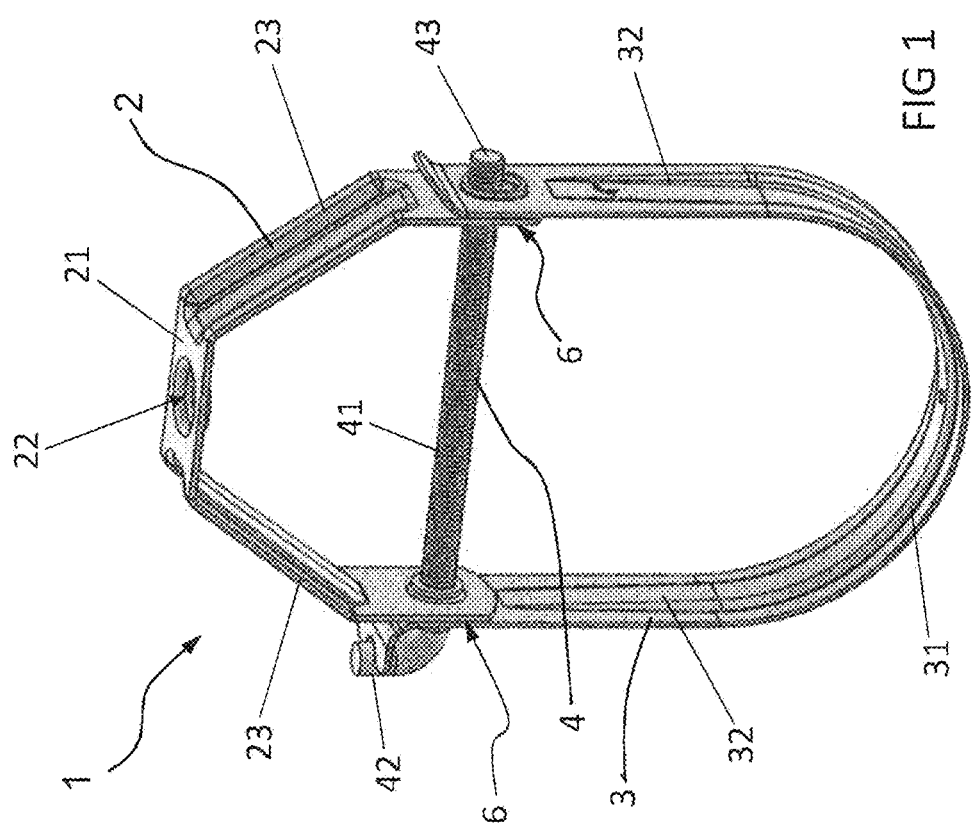
FIG. 1 shows a view in perspective of a pipe hanger according to invention in a closed state.
Figure 7:
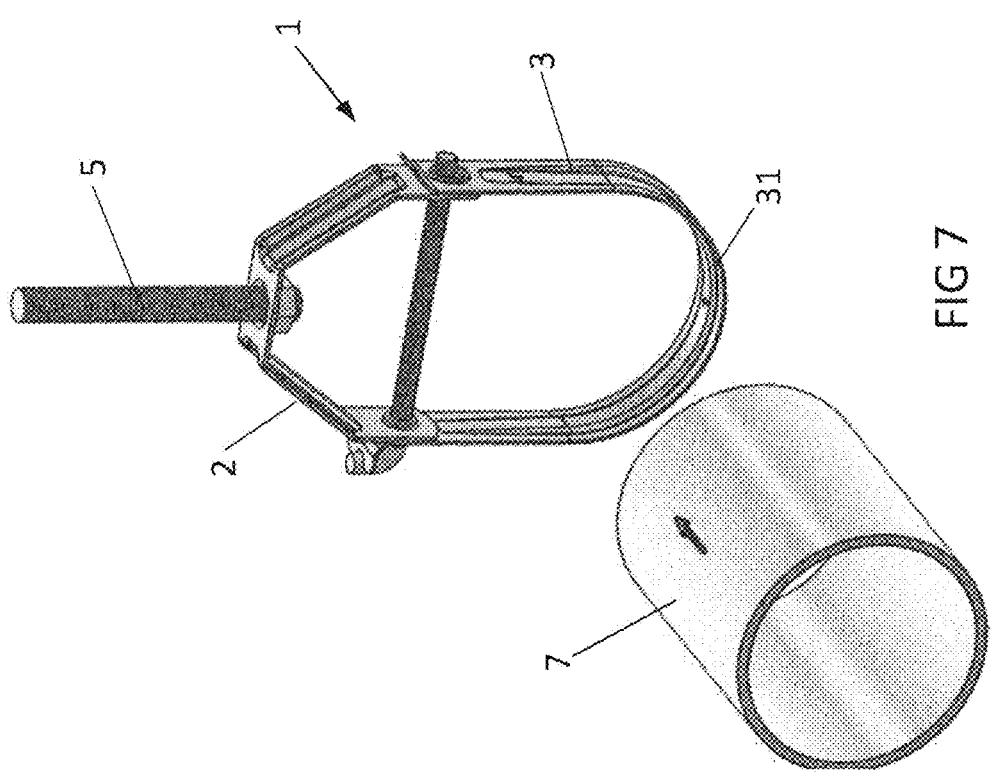
FIG. 7 illustrates a third installation method for installing a pipe into the pipe hanger of FIG. 1.

FIG. 1 shows a pipe hanger 1 for supporting pipes. The pipe hanger 1 is of the type which is often referred to in the art as a 'clevis hanger'. The pipe hanger 1 comprises an upper hanger part 2 and a lower hanger part 3. The upper hanger part 2 and the lower hanger part 3 are connected by a connecting rod 4. The upper hanger part 2 has a mounting hole 22 in a centre portion 21, which is adapted to be mounted to a support member, such as a threaded rod 5 as is shown in FIG. 7, for example. The threaded rod 5 is suspended from an overhead structure, which may be a ceiling or another support structure.

The upper hanger part 2 has a centre portion 21 and two downwardly extending depending arms 23 at the sides thereof. The upper hanger part 2 includes on each of its depending arms 23 at least one bore 24. The bores 24 are aligned in the embodiment shown in the figures. The bores 24 are in the embodiment shown in the figures provided with a female thread.

The lower hanger part 3, which shown separately in FIG. 3, has a saddle portion 31 for supporting a pipe and two upwardly extending legs 32 at the sides thereof. The lower hanger part 3 includes on each of the legs at least one aperture 33. The apertures 33 are aligned. The apertures 33 have an elongate shape or a slotted shape with a longitudinal axis extending in a longitudinal direction of the legs 32. The elongate shape of the apertures 33 provides some maneuvering space for the lower hanger part 3 with respect to the upper hanger part 2 during assembly and installation of a pipe as will become apparent further below.

The pipe hanger 1 is shown in FIG. 1 in a closed state. In the closed state, the depending arms 23 of the upper hanger part 2 and the corresponding legs 32 of the lower hanger part 3 are coupled by the connecting rod 4, which is passed through the aligned bores 24 of the upper hanger part 2 and apertures 33 in the legs 32 of the lower hanger part 3. The connecting rod 4 defines a substantially horizontal rotational axis, around which the lower hanger part 3 may swivel with respect to the upper hanger part 2.

In the closed state, the depending arms 23 of the upper hanger part 2 and the associated legs 32 of the lower hanger part 3 have an overlap, indicated by reference numeral 6, so as to allow for aligning the respective bores 24 and apertures 33 for passing through the connecting rod 4. The legs 32 of the lower hanger part 3 are arranged on an outer side of the depending arms 23 of the upper hanger part 2 in the overlap region 6.

The connecting rod 4 is preferably made of a threaded rod cut to length. It comprises a substantially straight shank 41 and an end portion 42 bent with respect to the shank 41. The shank 41 is passed through the bores 24 and apertures 33 of the upper hanger part 2 and the lower hanger part 3. The male thread on the shank 41 cooperates with the female thread in the bores 24.

Figure 2:
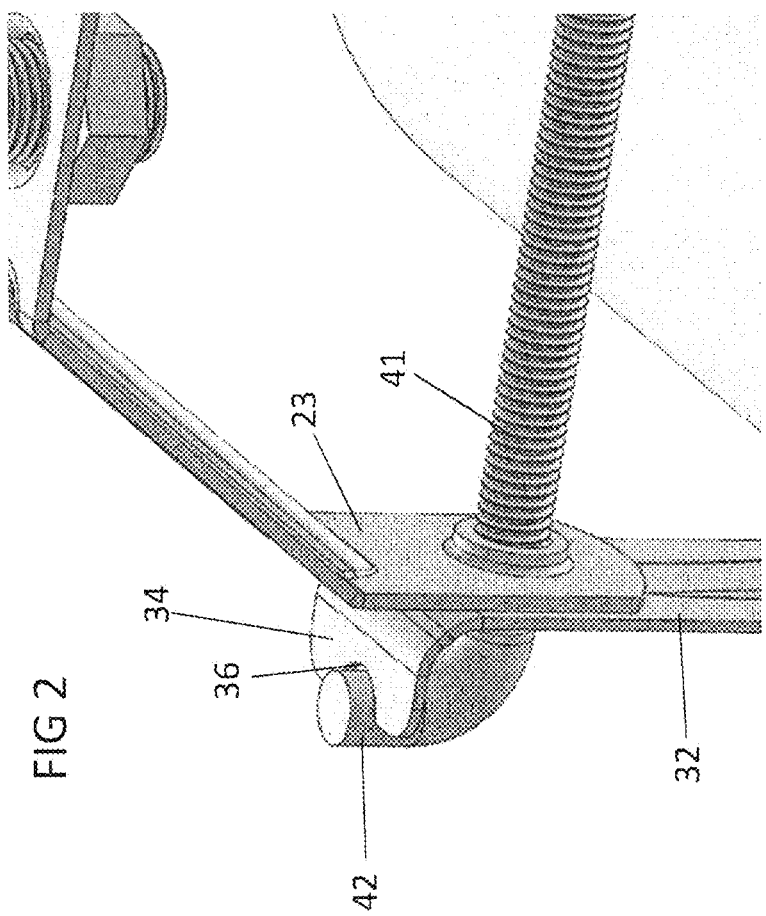
FIG. 2 shows a view in perspective of a detail of the pipe hanger of FIG. 1.

The legs 32 of the lower hanger part each have an outwardly bent flange. One of the legs 32 has an outwardly projecting flange 34, which is bent under a right angle with respect to the leg 32. The flange 34 has at an outer edge 35 wherein a recess 36 is formed, see FIG. 3. The recess 36 is open towards the edge 35 of the flange 34 and is adapted to receive the bent end portion 42 of the connecting rod 4 as is shown in more detail in FIG. 2. The end portion 42 that is received in the recess 36 in the flange 34 interlocks the lower hanger part 3 and the connection rod 4 in a rotational direction around the horizontal rotational axis in the closed state of the pipe hanger 1. The interlocked state with the lower hanger part 3 warrants that the connection rod 4 cannot be screwed loose and thus decoupled from the upper hanger 2 part. In the particular embodiment shown in the FIGS. 1-7, the recess 36 has a depth, which is about half the diameter of the bent end portion 42 of the connecting rod 4, but may also be less deep.

In an alternative embodiment, which is shown in FIGS. 8-10, a recess 136 is provided in the flange 134, which is an aperture having a closed contour. In particular, the aperture is formed as an elongate hole having a longitudinal axis. A nut 5 is screwed on an end 43 of the shank of the connecting rod 4.

The other leg 32 has a flange 37, which is bent outwards with respect to the leg under an angle less than 90°, preferably an angle in the range 30°-60°. This flange 37 provides a guiding surface 37A (cf. FIG. 4) upon closing of the pipe hanger 1, which guiding surface slides along the lower end of the corresponding depending arm 23 and an end 43 of the shank of the connecting rod 4 that extends through the overlapped arm 23 and leg 32.

During installation of the pipe hanger 1, the upper hanger portion 2 is suspended from an overhead support structure by means of a threaded rod 5 as is shown in FIG. 4. The shank 41 of the connecting rod 4 is screwed through the bores 24 in the arms 23 of the upper hanger part 2. The connecting rod 4 is rotated in a position such that the bent end portion 42 extends upwardly and provides a hook for suspending the lower hanger part 3 on. The friction in the screw connection maintains the connecting rod 4 in this position. In FIG. 4 is shown how the end of the leg 32, which is provided with the flange 34, is hooked with an elongate aperture 33 on the bent portion 42 of the connecting rod 4. This is in a tilted position of the lower hanger part 3 with respect to the upper hanger part 2, which is allowed by the elongate shape of the aperture 33. The hanger 1 is now assembled but in an open position.

In FIG. 5 is illustrated a first method to install a pipe in the pipe hanger 1. The lower hanger part 3 is suspended from the hook formed by the bent end portion 42 of the connecting rod 4. The pipe 7 is moved transversely in the open side of the hanger 1 and placed in the lower hanger part 3. Next, the lower hanger part 3 can be swivelled towards the closed position in which the free leg having the guiding flange 37 is hooked over the end 43 of the shank 41 of the connecting rod 4. Upon closing of the hanger 1, the inclined flange 37 makes sure that the flange and the associated leg 32 is guided outwardly from the corresponding arm 23 of the upper hanger part 2 and is guided outward of the end 43 of the shank 41.

In the closed state (cf. FIG. 1) a nut can be screwed on the end 43 of the shank 41, whereby the closed position of the hanger 1 is secured. By swivelling the lower hanger part 3 upward to the closed position, the flange 34 is swivelled and the recess 36 is moved over the bent end portion 42 of the connecting rod, which interlocks the lower hanger part 3 with the connecting rod 4. This has the effect that the lower hanger part 3 and the connecting rod 4 can mutually rotate around the rotation axis defined by the shank 41 of the connecting rod 4. A swivelling movement of the lower hanger part 3 around the rotational axis also rotates the connecting rod, which thereby moves slightly through the threaded bores 24. The connecting rod 4 is however screwed so far through the threaded bores 24 that the connecting rod 4 cannot come loose from the upper hanger part 2. This allows inter alia that the pipe 7 can thermally expand in the longitudinal direction thereby causing a swivelling of the lower hanger part 3 with respect to the upper hanger part 2.

Figure 6B:
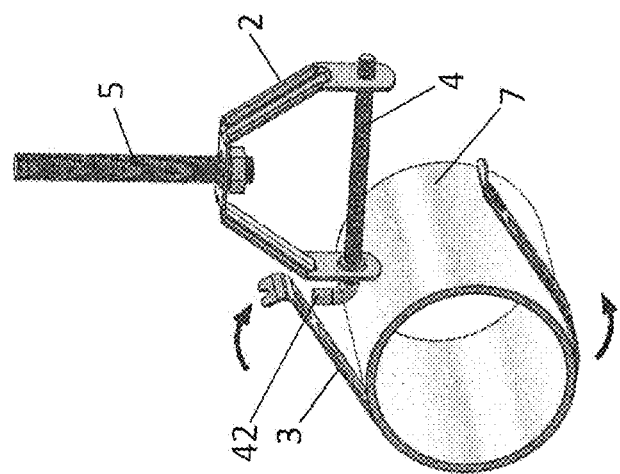
FIGS. 6A-6B illustrate a second installation method for installing a pipe in the pipe hanger of FIG. 1.
Figure 6A:
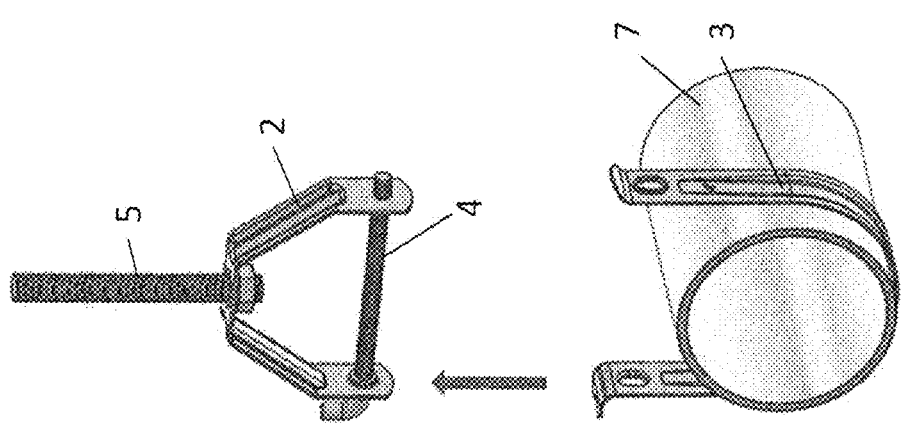

Another method to install a pipe in the pipe hanger 1 is illustrated in FIGS. 6A and 6B. In this method, the lower hanger part 3 is not initially suspended from the hook formed by the end portion 42 of the connecting rod 4, but the pipe 7 is arranged in the separate lower hanger part 3. Next the lower hanger part 3 with the pipe 7 in it are moved towards the upper hanger part 2 (cf. FIG. 6A) and the lower hanger part is hooked over the bent end portion 42 of the connecting rod (cf. FIG. 6B). Next, the pipe hanger 1 can be closed and locked in the same manner as is described in relation with FIG. 5.

Yet another method to install a pipe 7 in the pipe hanger 1 is illustrated in FIG. 7. In this method, the pipe hanger 1 is already in the closed state. Although there is not shown a nut on the end 43 of the shank 41 of the connecting rod 4, this may well be the case to avoid releasing the leg 32 on that side of the hanger 1 from the end 43. The pipe 7 is moved in the axial direction into the closed hanger 1. Because the bent end portion 42 of the connecting rod 4 is received in the recess 36, the lower hanger part 3 is allowed to swivel while rotating the connecting rod 4. The slight rotation of the connecting rod 4 however cannot decouple the connecting rod 4 from the arms 23 of the upper hanger part 2.

As is illustrated with reference to FIGS. 5-7 the pipe hanger 1 according to the invention is versatile in its use. On site, the user can select the way to install the pipe hanger 1 and to arrange the pipe 7 in the pipe hanger 1 as is best fit for the circumstances on site.

The invention claimed is:

1. A pipe hanger comprising an upper hanger part, a lower hanger part and a connecting rod, the upper hanger part being adapted to be mounted to a support member, wherein
the upper hanger part has a center portion and two downwardly extending depending arms at the sides thereof, which upper hanger part includes on each of its depending arms at least one bore, which bores are at least partially aligned,
the lower hanger part has a saddle portion for supporting a pipe and two upwardly extending legs at the sides thereof, which lower hanger part includes on each of the legs at least one aperture, which apertures are at least partially aligned,
wherein in a closed state of the pipe hanger the depending arms of the upper hanger part and the corresponding legs of the lower hanger part are coupled by the connecting rod, which is passed through said bores of both the upper hanger part and lower hanger part, the connecting rod defining a substantially horizontal rotational axis,
wherein in said closed state the depending arms of the upper hanger part and the corresponding legs of the lower hanger part have an overlapped portion so as to allow for aligning the respective bores of the arms and legs for passing through the connecting rod,
wherein the connecting rod comprises a substantially straight shank and an end portion bent with respect to the shank, the shank being passed through said bores of both the upper hanger part and the lower hanger part,
wherein the legs of the lower hanger part are arranged on an outer side of the depending arms of the upper hanger part in the overlapped portion,
wherein at least the shank of the connecting rod is at least partially provided with a male thread, wherein at least one of the bores of the depending arms are threaded holes, wherein in the closed state the shank of the connecting rod is threaded through said at least one threaded hole, and
wherein at least one of the legs of the lower hanger part has an outwardly projecting flange formed as a bent end portion of said leg, said flange having a recess adapted to receive the bent end portion of the connecting rod so as to interlock the connecting rod and the lower hanger part in a rotational direction around the rotational axis in the closed state.

2. The pipe hanger according to claim 1, wherein the end portion of the connecting rod is bent at a substantially right angle with respect to the shank, such that the connecting rod has generally an L-shape.

3. The pipe hanger according to claim 1, wherein the outwardly projecting flange is bent at a substantially right angle with respect to the leg.

4. The pipe hanger according to claim 2, wherein the outwardly projecting flange is bent at a right angle with respect to the leg, and wherein the bent end portion of the connecting rod is received in the recess of the flange at a right angle.

5. The pipe hanger according to claim 1, wherein—in the closed state, or in an intermediate closing state wherein the connecting rod is threaded through the at least one threaded in the depending arms but the upper hanger part and the corresponding legs of the lower hanger part are not yet coupled—the bent end portion of the connecting rod extends upwardly.

6. The pipe hanger according to claim 1, wherein the apertures of the legs of the lower hanger part are elongate apertures.

7. The pipe hanger according to claim 6, wherein the elongate apertures have a longitudinal axis extending in a longitudinal direction of the legs.

8. The pipe hanger according to claim 1, wherein the recess is formed in an edge of the flange.

9. The pipe hanger according to claim 8, wherein the recess has a semi-cylindrical shape.

10. The pipe hanger according to claim 8, wherein the recess is provided in an outwardly facing edge of the flange.

11. The pipe hanger according to claim 1, wherein the recess is formed as an elongate hole provided in the flange, said elongate hole having a longitudinal axis extending in the outward direction.

12. The pipe hanger according to claim 1, wherein the other one of the legs has a bent end portion, which is bent outwardly over an angle less than 90° with respect to the leg.

13. A method for installation of a pipe in a hanger according to claim 1, wherein:
the lower hanger part is with the aperture of the leg having the flange in a hooked state over the bent end portion of the connecting rod;
the pipe is moved transversely through an opening between the other leg and the corresponding arm of the upper hanger part and arranged in the lower hanger part;
the lower hanger part is swivelled towards the closed state in which said other leg with its aperture is hooked over the end of the shank opposite the bent end portion;
a nut is screwed on the end of the shank.

14. A method for installation of a pipe in a hanger according to claim 1, wherein:
the pipe is arranged in the lower hanger part, which is disassembled from the upper hanger part;
the lower hanger part with the pipe in it is moved towards the upper hanger part;
the lower hanger part is hooked with the aperture of the leg having the flange over the bent end portion of the connecting rod; and
the lower hanger part is swivelled towards the closed state in which the free leg is hooked with its aperture over the end of the shank opposite the bent end portion;
a nut is screwed on the end of the shank.

15. A method for installation of a pipe in a hanger according to claim 1, wherein the pipe hanger is in the closed state and the pipe is moved in an axial direction into the closed pipe hanger.

16. The pipe hanger according to claim 10, wherein, preferably, the recess has a dimension corresponding to about half the diameter of the connecting rod.

17. The pipe hanger according to claim 12, wherein said other leg is bent outwardly over an angle in the range 30°-60° with respect to the leg.

* * * * *